United States Patent
Hsieh

(10) Patent No.: US 8,857,297 B2
(45) Date of Patent: Oct. 14, 2014

(54) MANUFACTURING METHOD, STRUCTURE AND APPLICATION OF ELASTIC C-SHAPED STEEL BLOCK

(75) Inventor: Chih-Ching Hsieh, Taichung (TW)

(73) Assignee: Kabo Tool Company, Taichung (TW)

( * ) Notice: Subject to any disclaimer, the term of this patent is extended or adjusted under 35 U.S.C. 154(b) by 224 days.

(21) Appl. No.: 13/471,470

(22) Filed: May 15, 2012

(65) Prior Publication Data

US 2013/0174697 A1    Jul. 11, 2013

(30) Foreign Application Priority Data

Jan. 9, 2012  (TW) .............................. 101100856 A

(51) Int. Cl.
*B25B 13/46* (2006.01)
(52) U.S. Cl.
USPC .................................................. 81/60; 81/64
(58) Field of Classification Search
USPC ................................................ 81/58, 60, 64
See application file for complete search history.

(56) References Cited

U.S. PATENT DOCUMENTS

| 3,590,668 | A  | * | 7/1971 | Bristol ............................. 81/64 |
| 6,237,448 | B1 | * | 5/2001 | Haxton ............................. 81/64 |
| 6,988,430 | B1 | * | 1/2006 | Putney et al. .................... 81/64 |
| 7,418,890 | B2 | * | 9/2008 | Buchanan ........................ 81/64 |

FOREIGN PATENT DOCUMENTS

WO    WO2012028869    *  3/2012    ............ B25B 13/46

* cited by examiner

*Primary Examiner* — Hadi Shakeri
(74) *Attorney, Agent, or Firm* — CKC & Partners Co., Ltd.

(57) ABSTRACT

A manufacturing method of an elastic C-shaped steel block is described, which includes the following steps. An ordinary steel is cut into a round steel tube. The round steel tube is processed into a ratchet hex socket steel tube. The ratchet hex socket steel tube is cut into a ratchet hex socket block. The ratchet hex socket block is transformed into an elastic ratchet hex socket block by a thermal treatment. An opening is formed in the elastic ratchet hex socket block to change the elastic ratchet hex socket block into a C-shaped elastic steel block.

2 Claims, 5 Drawing Sheets

MANUFACTURING METHOD, STRUCTURE AND APPLICATION OF ELASTIC C-SHAPED STEEL BLOCK

RELATED APPLICATIONS

This application claims priority to Taiwan Application Serial Number 101100856, filed Jan. 9, 2012, which is herein incorporated by reference.

FIELD OF THE INVENTION

The present invention relates to a manufacturing method of an elastic steel block, and more particularly to a manufacturing method of an elastic steel block applied to a hand tool.

BACKGROUND OF THE INVENTION

An existing unidirectional ratchet wrench is formed by wedging a plurality of C-shaped steel sheets between an annular head and a ratchet. The number of the C-shaped steel sheets effects the operation of the ratchet. Further, the structures of the C-shaped steel sheets may be damaged due to the excessive large action force. In addition, a steel block could not have the same elastic effect as the steel sheets if the block steel is processed by a conventional treatment technique of the steel sheet. Furthermore, the cutting of the steel sheet is another difficult problem. Moreover, the use of the plurality of steel sheets increases the cost and is easier to cause problems and inconvenience in an assembly process. Due to the limitation of the exist techniques of treating the steel, the aforementioned problems caused by using the plurality of steel sheets cannot be solved.

SUMMARY OF THE INVENTION

Therefore, one aspect of the present disclosure is to provide a manufacturing method of a C-shaped elastic steel block to overcome the problems occurred in the existing techniques of processing steel.

According to one embodiment of the aspect of the present disclosure, a manufacturing method of a C-shaped elastic steel block is provided, which includes the following steps. An ordinary steel is cut into a round steel tube. The round steel tube is processed into a ratchet hex socket steel tube. The ratchet hex socket steel tube is cut into a ratchet hex socket block. The ratchet hex socket block is transformed into an elastic ratchet hex socket block by a thermal treatment. An opening is formed in the elastic ratchet hex socket block to change the elastic ratchet hex socket block into a C-shaped elastic steel block.

Accordingly, with the application of the aforementioned embodiment, the steel block has the same elastic effect as a steel sheet, and the step of cutting the steel block into the steel sheet can be eliminated.

Another aspect of the present disclosure is to provide a C-shaped elastic steel block manufactured by using the aforementioned method and an application thereof, so as to overcome problems of increasing cost and inconvenient fabrication resulted from the aforementioned method of using a plurality of steel sheets.

According to one embodiment of the aspect of the present disclosure, a C-shaped elastic steel block structure manufactured by using the aforementioned method is provided, which is assembled in a ratchet wrench. The C-shaped elastic steel block structure includes a C-shaped elastic steel block, a ratchet portion and a female joint portion. The ratchet portion encircles an outer side of the C-shaped elastic steel block and is engaged with the ratchet wrench, so as to make the C-shaped elastic steel block be only rotated unidirectionally in relation to the ratchet wrench. The female joint portion is arranged at an inner side of the C-shaped elastic steel block for receiving and being jointed with a work piece.

Furthermore, in other embodiments of the aspect of the present disclosure, each curve of the female joint portion has a concave arc for decreasing stress born by each curve. In addition, the C-shaped elastic steel block may further include a plurality of deformed regions and a plurality of supporting regions. The deformed regions are disposed on curves of the female joint portion for elastic deformation of the C-shaped elastic steel block. The supporting regions are used to keep structural strength of the C-shaped elastic steel block, and a width of the supporting regions is greater than a width of the deformed regions.

According to another embodiment of the aspect of the present disclosure, a ratchet wrench is provided, which includes a wrench body, an annular head, and a C-shaped elastic steel block structure manufactured by the aforementioned method. The annular head is disposed on one end of the wrench body, and the annular head has an annular tooth portion formed inside. The C-shaped elastic steel block structure includes a C-shaped elastic steel block, a ratchet portion and a female joint portion. The C-shaped elastic steel block is disposed within the annular head. The ratchet portion encircles an outer side of the C-shaped elastic steel block and is engaged with the annular tooth portion, so as to make the C-shaped elastic steel block be only rotated unidirectionally in relation to the annular head. The female joint portion is arranged at an inner side of the C-shaped elastic steel block for receiving and being jointed with a work piece.

Therefore, the aforementioned embodiments use the C-shaped elastic steel block structure manufactured by the aforementioned method to replace a plurality of steel sheets and a working barrel used in the prior arts, so as to solve the problems of increasing cost and inconvenient fabrication.

DETAILED DESCRIPTION OF THE PREFERRED EMBODIMENT

Figure 1:
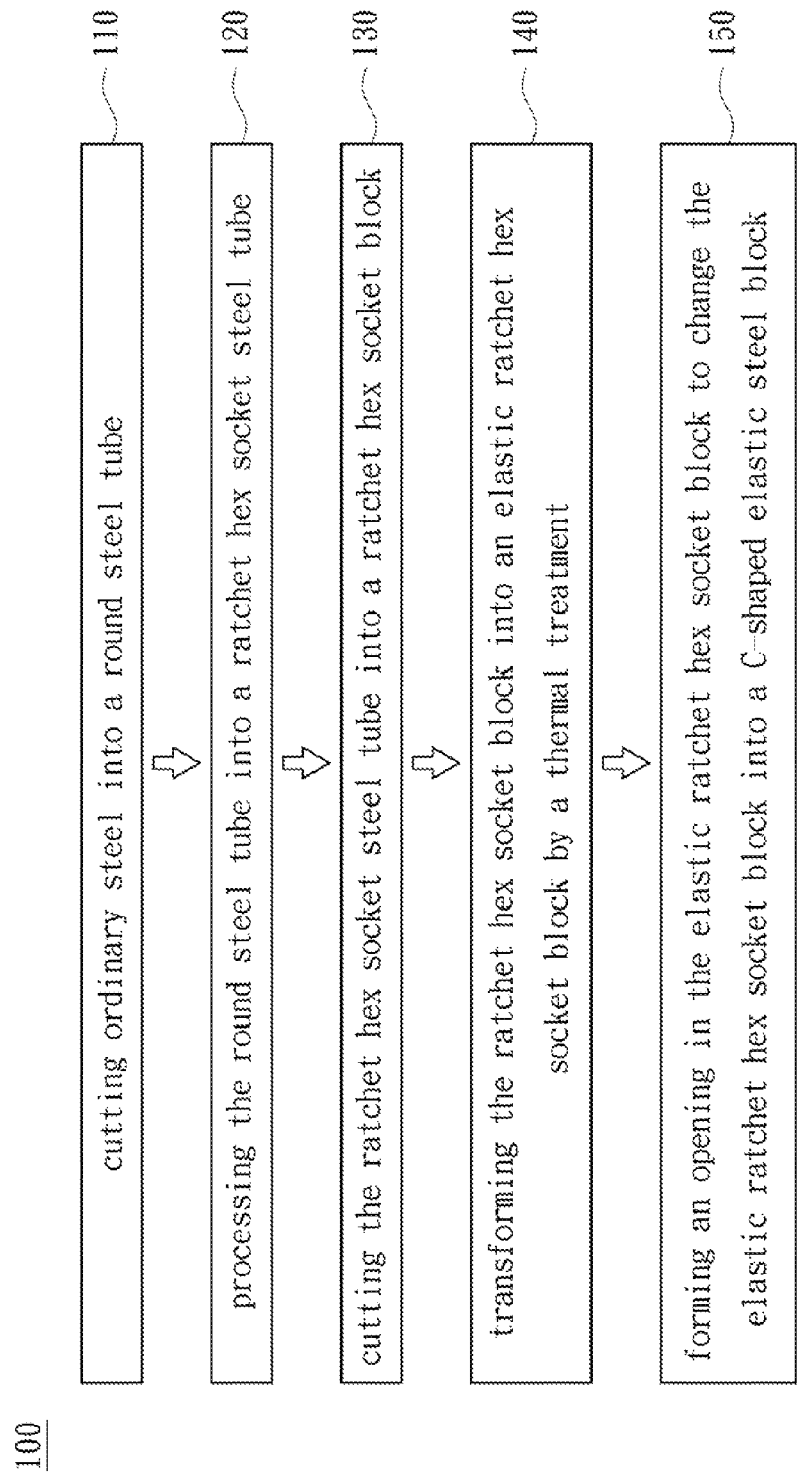
FIG. 1 is a flowchart showing a manufacturing method of a C-shaped elastic steel block in accordance with an embodiment of the present disclosure.

FIG. 1 is a flowchart showing a manufacturing method of a C-shaped elastic steel block in accordance with an embodiment of the present disclosure. As shown in FIG. 1, a method 100 for manufacturing a C-shaped elastic steel block includes the following steps. In a step 110, an ordinary steel is cut into a round steel tube. In a step 120, the round steel tube is processed into a ratchet hex socket steel tube. In a step 130, the ratchet hex socket steel tube is cut into a ratchet hex socket block. In a step 140, the ratchet hex socket block is transformed into an elastic ratchet hex socket block by a thermal treatment. In a step 150, an opening is formed in the elastic ratchet hex socket block to change the elastic ratchet hex socket block into a C-shaped elastic steel block.

In the step 110, the ordinary steel is steel only containing an element carbon, and is also referred to carbon steel. The ordinary steel is cut into a round steel tube. As implied by the name, the round steel tube is tubular steel.

In the step 120, the round steel tube is processed to form teeth on an outside of the round steel tube and to make an inside of the round steel tube be a hexagon, so as to form a ratchet hex socket steel tube.

Next, the step 130 is performed to cut the ratchet hex socket steel tube into a plurality of ratchet hex socket blocks.

Then, the ratchet hex socket block is transformed into an elastic ratchet hex socket block by a thermal treatment in the step 140. The thermal treatment means that the steel is heated to a critical temperature, and then is cooled to the room temperature at different cooling rates, in which the steel treated by rapidly cooling can has high hardness and high strength, and the steel treated by slowly cooling can has adverse effects. Common thermal treatment operations include annealing, quenching (hardening), tempering, normalizing, spheroidizing and surface hardening. The aforementioned thermal treatment methods are existing prior arts for treating the steel, and it is an ordinary skill for a person skilled in the art that the steel can be transformed into an elastic steel after a thermal treatment. Therefore, the thermal treatment methods and how the steel is transformed into elastic steel are not within the scope of the present embodiment.

Subsequently, the opening is formed in the elastic ratchet hex socket block in the step 150, so as to change the elastic ratchet hex socket block into a C-shaped elastic steel block. The step 150 is used to increase the elastic deformation space of the C-shaped elastic steel block. The ratchet hex socket block is an integrated structure in the step 140, so that the materials in every portions of the ratchet hex socket block are uniformly heated and varied during the thermal treatment, and the internal structure of the whole ratchet hex socket block is uniform, thereby preventing stress concentration from occurring at some location. The opening is formed to increase the elastic deformation space of the C-shaped elastic steel block, which already has elasticity. The prior art processing techniques, such as milling, wire cutting, stamping, wire cutting and etc. are practicable, and are not the main technique features of the present embodiment.

By adjusting the steps of treating the steel, the ratchet hex socket block can be effectively transformed into the elastic ratchet hex socket block. Therefore, the steel block has the same elastic effect as a steel sheet, and it can prevent the problems caused by cutting the steel block into the steel sheet.

Figure 2:
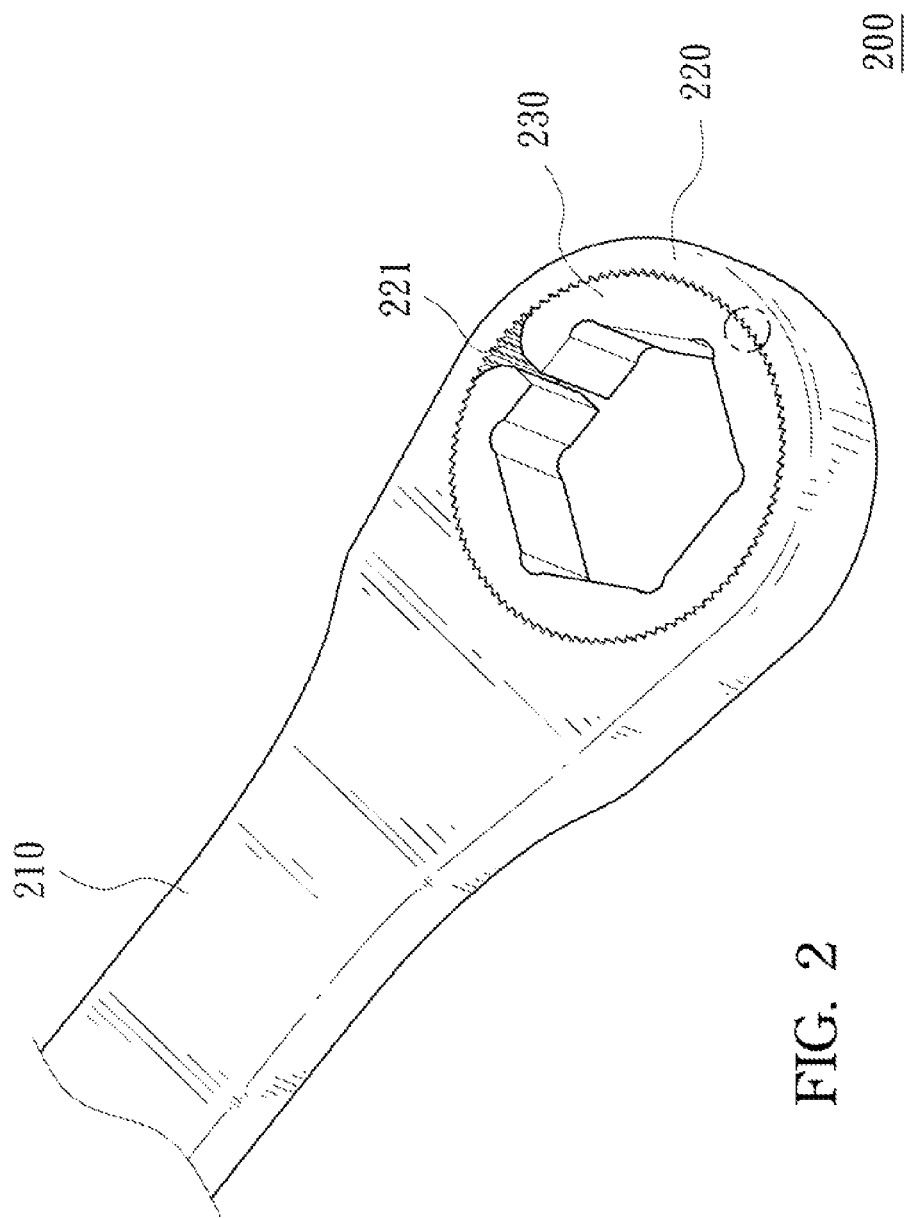
FIG. 2 is a three-dimensional diagram showing a ratchet wrench in accordance with another embodiment of the present disclosure.
Figure 3:
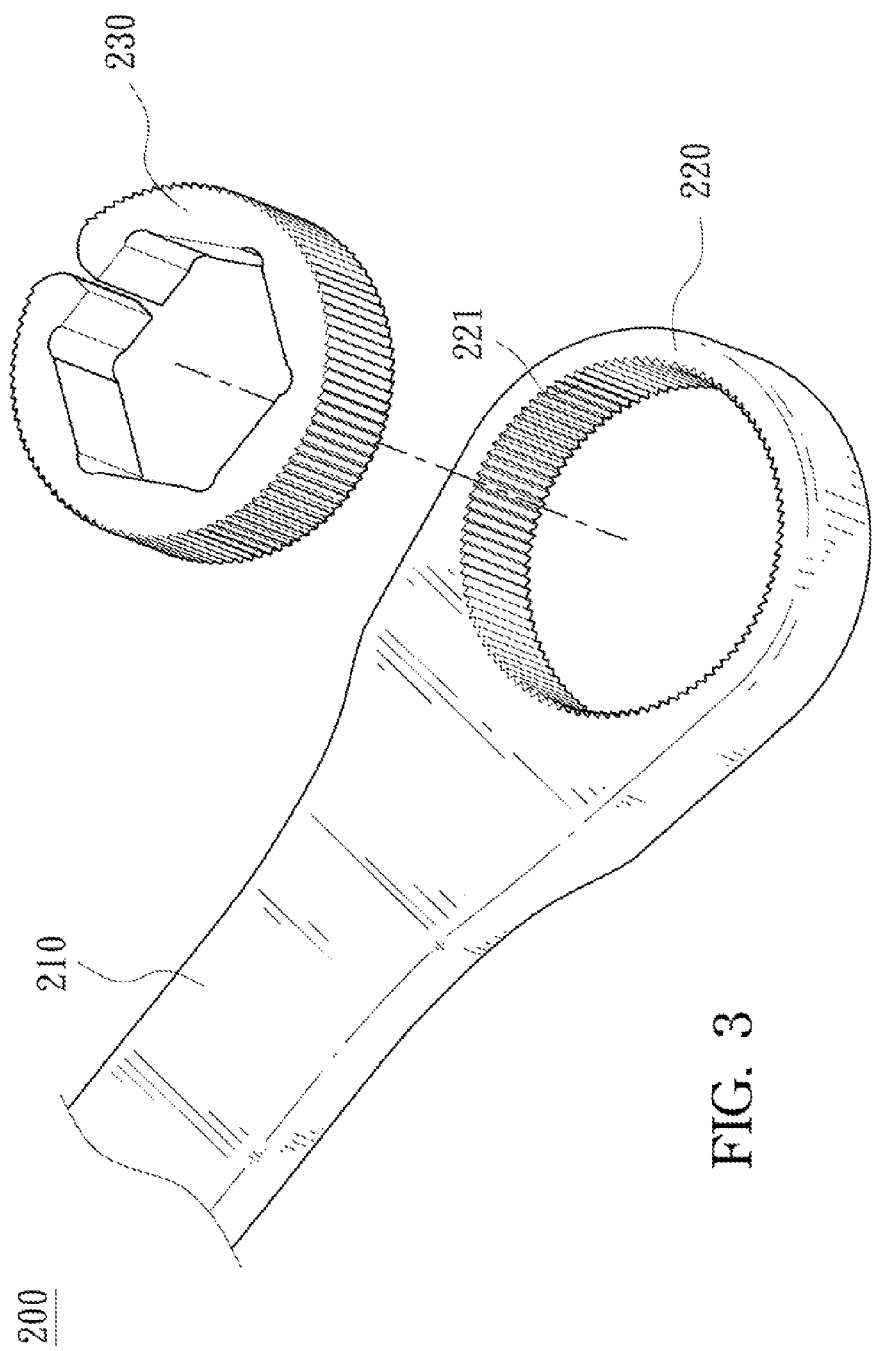
FIG. 3 is a breakdown drawing of the ratchet wrench in FIG. 2.

FIG. 2 is a three-dimensional diagram showing a ratchet wrench in accordance with another embodiment of the present disclosure. FIG. 3 is a breakdown drawing of the ratchet wrench in FIG. 2. As shown in FIG. 2 and FIG. 3, a ratchet wrench 200 includes a wrench body 210, an annular head 220, and a C-shaped elastic steel block structure 230 manufactured by the aforementioned method. The annular head 220 is disposed on one end of the wrench body 210, and the annular head 220 has an annular tooth portion 221 formed inside. Only one end of the wrench body 210 of the present embodiment is a working end, i.e. the annular head 220. However, whether the other end of the wrench body 210 is a working end, such as an opening end, or not, it has no influence on the technique features of the present embodiment. In addition, the annular tooth portion 221 within the annular head 220 of the present embodiment includes teeth. Why the annular tooth portion 221 is designed to include teeth is described as follows.

Figure 4:
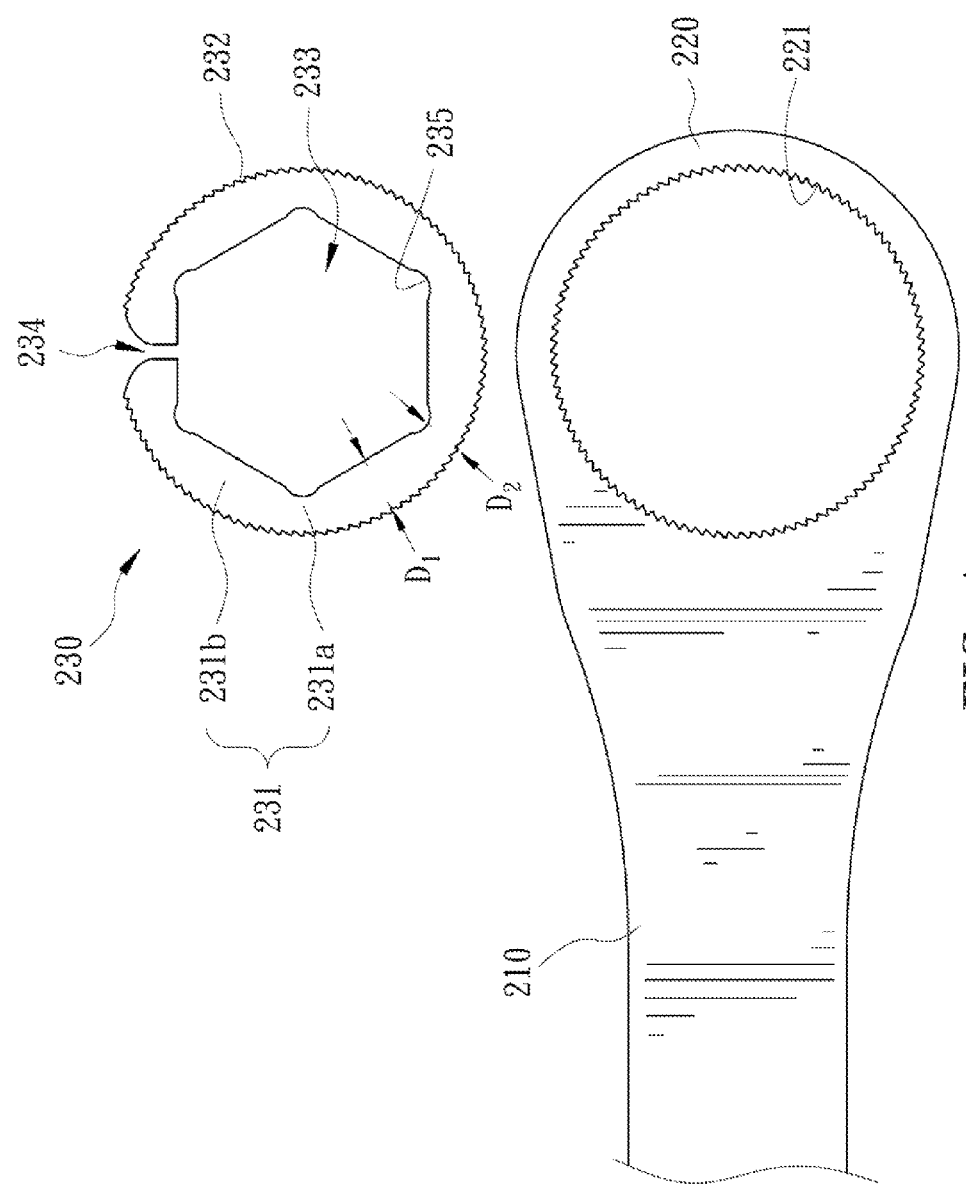
FIG. 4 is a front view of the breakdown ratchet wrench in FIG. 2.
Figure 5:
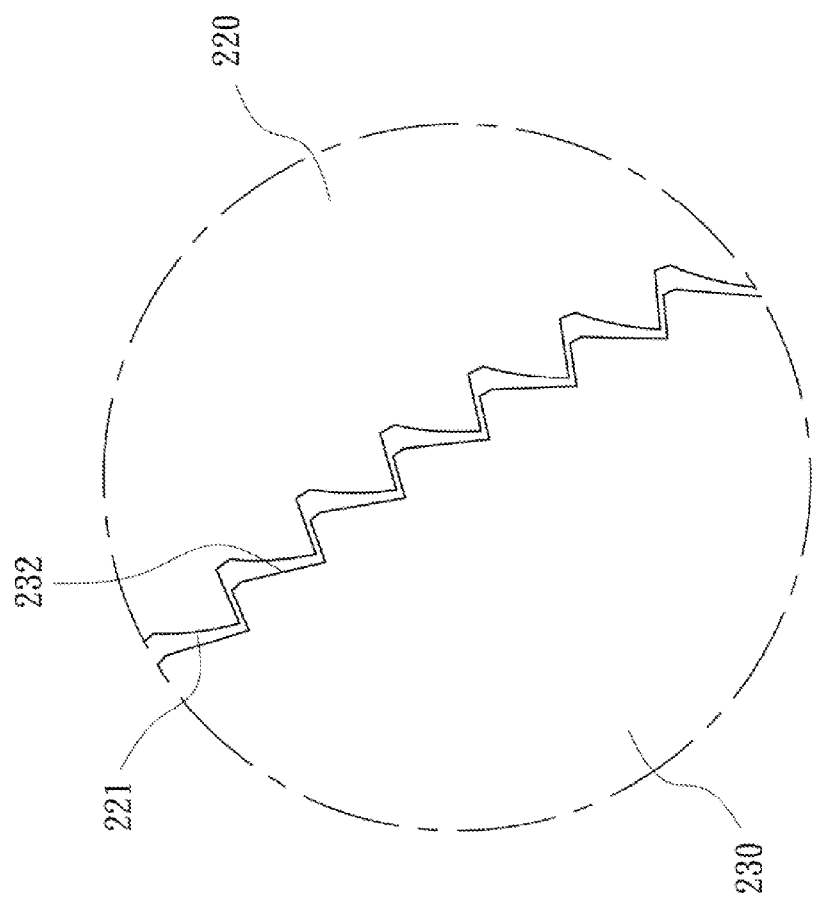
FIG. 5 is a partial enlarged drawing of the ratchet wrench in FIG. 2.

FIG. 4 is a front view of the breakdown ratchet wrench in FIG. 2. FIG. 5 is a partial enlarged drawing of the ratchet wrench in FIG. 2. The C-shaped elastic steel block structure 230 includes a C-shaped elastic steel block 231, a ratchet portion 232 and a female joint portion 233.

The C-shaped elastic steel block 231 is disposed within the annular head 220 and has an opening 234 to provide space for elastic deformation of the C-shaped elastic steel block 231.

The ratchet portion 232 encircles an outer side of the C-shaped elastic steel block 231 and is engaged with the annular tooth portion 221, so as to make the C-shaped elastic steel block 231 be only rotated unidirectionally in relation to the annular head 220. In other words, the C-shaped elastic steel block 231 is only rotated clockwise or anticlockwise in relation to the annular head 220.

The female joint portion 233 is arranged at an inner side of the C-shaped elastic steel block 231 for receiving and being jointed with a work piece. Take the view direction of FIG. 4 in the present embodiment as an example, after the female joint portion 233 receiving and being jointed with the work piece, if the user clockwise rotates the wrench body 210, the ratchet portion 232 is wedged in the annular tooth portion 221, so that the C-shaped elastic steel block 231 cannot be rotated in relation to the annular head 220, and the user can rotate the work piece successfully. On the contrary, if the user anticlockwise rotates the wrench body 210, due to the special design of the engaging teeth of the ratchet portion 232 and the annular tooth portion 221, the C-shaped elastic steel block 231 is idling in relation to the annular head 220. Therefore, it is unnecessary to separate the female joint portion 233 and the work piece, and the user can rotate the wrench body 210 to the original position in which the wrench body 210 starts to drive the work piece to continuously rotate the work piece.

In the present embodiment, the female joint portion 233 is a hexagon, and each curve of the female joint portion 233 has a concave arc 235 for decreasing stress born by each curve. In addition, the C-shaped elastic steel block 231 may further include a plurality of deformed regions 231*a* and a plurality of supporting regions 231*b*.

The deformed regions 231*a* are disposed on curves of the female joint portion 233 for elastic deformation of the C-shaped elastic steel block 231. The supporting regions 231*b* are used to keep structural strength of the C-shaped elastic steel block 231. For the differences between the functions required by the deformed regions 231*a* and the supporting regions 231*b*, in the present embodiment, a width $D_1$ of the supporting region 231*b* is designed to be greater than a width $D_2$ of the deformed region 231*a* to make the supporting region 231*b* having the width $D_1$ have sufficient structural strength to resist the elastic deformation, and to make the deformed region 231*a* having the width $D_2$ have sufficient structural strength to support the C-shaped elastic steel block 231.

The present embodiment uses the C-shaped elastic steel block structure 230 manufactured by the aforementioned method to replace a plurality of steel sheets and a working barrel used in the prior arts. The C-shaped elastic steel block structure 230 is a block body, so that the C-shaped elastic steel block structure 230 has superior obstructing and driving effects than the sheets used in the prior arts, thereby solving the problems of increasing cost caused by the steel sheets. Furthermore, the design of the present embodiment can increase the convenience of fabrication and maintenance of the ratchet wrench 200.

According to the aforementioned embodiments, it is known that with the application of a manufacturing method, a structure and an application of an elastic C-shaped steel block of the present disclosure, the problems caused by processing steel sheets in the prior arts are successfully solved, and the structure of the unidirectional ratchet wrench having complex components is simplified, thereby effectively increasing the efficiency of the ratchet wrench.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A C-shaped elastic steel block structure, wherein the C-shaped elastic steel block structure is assembled in a ratchet wrench and includes:
   a C-shaped elastic steel block, wherein the C-shaped elastic steel block is formed by a thermal treatment as an one-piece, and has an opening for providing space for elastic deformation of the C-shaped elastic steel block;
   a ratchet portion encircling an outer side of the C-shaped elastic steel block and being engaged with the ratchet wrench, so as to make the C-shaped elastic steel block be only rotated unidirectionally in relation to the ratchet wrench; and
   a female joint portion arranged at an inner side of the C-shaped elastic steel block for receiving and being joined with a work piece, wherein the female joint portion has a plurality of curves, and each of the curves has a concave arc for decreasing stress born by each of the curves;
   wherein the C-shaped elastic steel block includes:
   a plurality of deformed regions for elastic deformation of the C-shaped elastic steel block; and
   a plurality of supporting regions used to keep structural strength of the C-shaped elastic steel block, wherein a width of the supporting regions is greater than a width of the deformed regions, each of the supporting regions extends between a pair of adjacent deformed regions, the deformed regions and the supporting regions cooperate to define the female joint portion, and the deformed regions respectively form concave arcs in the female joint portion;
   wherein the opening of the C-shaped elastic steel block is defined by a pair of spaced-apart substantially parallel walls, each of the walls extending straight a predetermined distance then curving outwardly in a direction away from the other one of the walls.

2. A ratchet wrench, including:
   a wrench body;
   an annular head disposed on one end of the wrench body, wherein the annular head has an annular tooth portion formed inside; and
   a C-shaped elastic steel block structure, wherein the C-shaped elastic steel block structure includes:
   C-shaped elastic steel block disposed within the annular head, wherein the C-shaped elastic steel block is formed by a thermal treatment as an one-piece, and has an opening for providing space for elastic deformation of the C-shaped elastic steel block;
   a ratchet portion encircling an outer side of the C-shaped elastic steel block and engaged with the annular tooth portion, so as to make the C-shaped elastic steel block be only rotated unidirectionally in relation to the annular head; and
   a female joint portion arranged at an inner side of the C-shaped elastic steel block for receiving and being joined with a work piece, wherein the female joint portion has a plurality of curves, and each of the curves has a concave arc for decreasing stress born by each of the curves;
   wherein the C-shaped elastic steel block includes:
   a plurality of deformed regions for elastic deformation of the C-shaped elastic steel block; and
   a plurality of supporting regions used to keep structural strength of the C-shaped elastic steel block, wherein a width of the supporting regions is greater than a width of the deformed regions, each of the supporting regions extends between a pair of adjacent deformed regions, the deformed regions and the supporting regions cooperate to define the female joint portion, and the deformed regions respectively form concave arcs in the female joint portion;
   wherein the opening of the C-shaped elastic steel block is defined by a pair of spaced-apart substantially parallel walls, each of the walls extending straight a predetermined distance then curving outwardly in a direction away from the other one of the walls.

* * * * *